Patented May 11, 1943

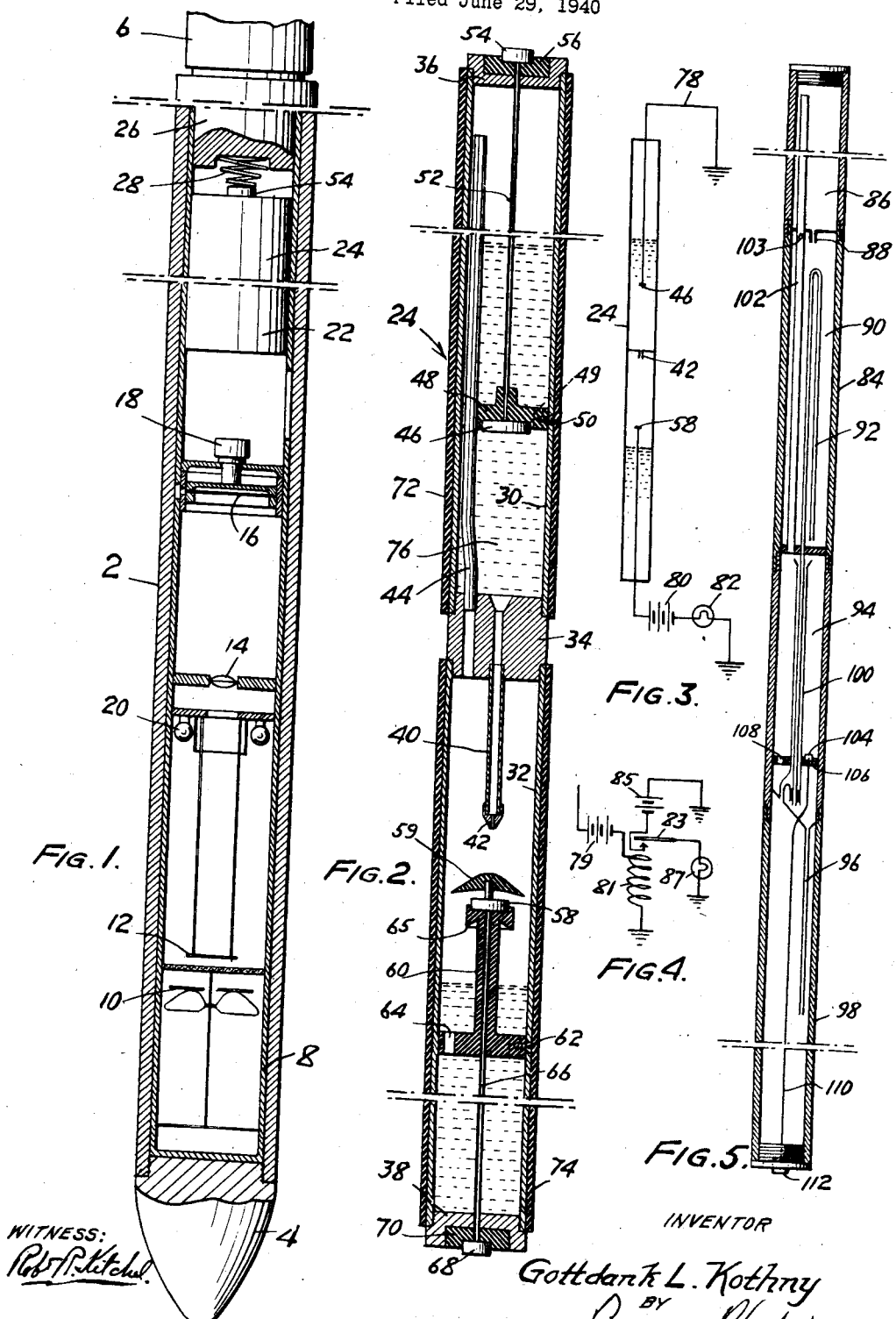

2,318,612

UNITED STATES PATENT OFFICE 2,318,612

WELL SURVEYING DEVICE

Gottdank L. Kothny, Strafford, Pa., assignor to Sperry-Sun Well Surveying Company, Philadelphia, Pa., a corporation of Delaware Application June 29, 1940, Serial No. 343,183

2 Claims. (Cl. 200—33)

This invention relates to a well surveying device, and has particular reference to a timing means for determining the time of making a record.

In single shot photographic well surveying devices, for example, of the type of that disclosed in the patent to Hewitt 2,116,350, dated May 3, 1938, the time at which the exposure is made and the duration of the exposure are controlled by means of a watch controlling an electrical switch. Such a timing means must necessarily be of very small size to fit inside small size instruments and is of a very delicate nature. Its delicate mechanism, furthermore, must make the electrical contact which must carry a substantial amount of current. It will be evident that these requirements and limitations of size render the timing mechanism quite costly and subject to trouble because of the rough handling and dirt to which it is subjected at a drilling rig.

Not only photographic instruments, but other well surveying instruments as well require timing devices to determine the time at which a record is made and, in some cases, the duration of operation to complete a record. Examples of such well surveying devices are the spark recording instrument of Smith Patent 2,152,671, dated April 4, 1939, and the electrolytic recording instrument of Ring application Serial No. 313,706, filed January 13, 1940. In the case of the latter instrument, there are occasions when timing rather than control by handling may be desirable.

It is the object of the present invention to provide a timing device for a well surveying instrument in which flow of liquid is used to control the timing and in which the timing is effected electrically.

The liquid used may be either mercury or an aqueous electrolyte as described below. Each of these has particular advantages depending upon the type of well surveying instrument which is being controlled.

The above and other objects of the invention, particularly relating to details, will become apparent from the following description, read in conjunction with the accompanying drawing, in which:

Figure 1 is a vertical axial section taken through one form of well surveying instrument embodying the timing device;

Figure 2 is a vertical axial sectional view through the timing element;

Figure 3 is a wiring diagram of the timing element and its electrical connections;

Figure 4 is a partial wiring diagram showing the alternative arrangement involved if a relay is used; and Figure 5 is a vertical axial section through a modified timing element involving only a single pair rather than two pairs of electrodes.

The well surveying instrument illustrated is, generally speaking, of the type described in said Hewitt Patent 2,116,350, and comprises a protective casing 2, provided with a lower nose plug 4 and an upper plug 6 to which a wire line is to be attached for lowering the instrument in a bore hole. The operating parts of the surveying instrument are contained in an inner casing 8 within which is located a floating compass 10, a pendulum 12 and a lens 14 for projecting images of the pendulum and compass upon a photographically sensitized disc 16 held in a clamping device 18 of conventional character. To produce the photographic exposure providing the record there are provided one or more lamps 20 adapted to illuminate the compass and pendulum. In this type of instrument, a timing device, heretofore a watch as described above, has been used to delay illumination of the lamps for a period sufficient to permit the location of the instrument where the record is to be made and then to provide illumination for a sufficient period to effect the making of a record. The various record elements are shown merely for the purpose of illustration, as it will be evident that they may take any of the forms common in the art; for example, the compass may be omitted if the instrument is merely to give a record of inclination; or a pair of compasses without a pendulum or other inclination indicating device may be provided if the instrument is to be used for orientation of tools in accordance with, for example, Hyer Patent 2,120,670, dated June 14, 1938. In fact, as will be pointed out later, the lamps 20 are merely representative of devices of other types which may be electrically energized to produce records.

Located above the recording devices are devices indicated at 22 including batteries and, if the wiring arrangement of Figure 4 is used, a relay. Additionally such elements may be here included as are necessary for special applications. Above these elements there is indicated at 24 a timing device per se. At the top of the timing device is an electrical contact member 54 arranged to engage a contact making spring 26 carried by a cap 26 of the casing 8.

The timing device is illustrated in detail in Figure 2, and comprises upper and lower cylinders 30 and 32, respectively, connected by a member 34 which provides a bottom wall for the upper cylinder and a top wall for the lower one. The top of the upper cylinder is closed by a cap member 36 and the lower end of the lower cylinder by a cap member 38. As will be evident hereafter, these closures are to be of a substantially permanent nature to be removed only in the event that repairs or replacements are required. Preferably these ends are brazed or soldered in position after the apparatus is assembled.

Communicating with an opening in the member 36 is a tube 40 which, at its lower end, carries a calibrated orifice member 42 designed to control the slow flow of liquid from the upper into the lower chamber. Also communicating with an opening in the member 34 is a tube 44, which extends adjacent the top of the upper cylinder 30.

An electrode disc 46 is carried by an insulating member 48 provided with a series of openings 49 extending about it to provide for the free passage of liquid. A set screw 50 holds the member 48 in fixed position in the cylinder 30. The electrode 46 is connected by means of an insulated wire 52 to the contact element 54 previously mentioned, which is set in an insulating insert 56 in the cap 36.

A second electrode 58 in the form of a disc is located in the lower cylinder 32, being held in the upper end of a "Bakelite" or similar insert 60 provided with openings 64 to permit free passage of fluid and held in position in the cylinder by means of a set screw 62. As will be described hereafter, bridging between the electrode 58 and the walls of the cylinder 32 by liquid should involve the highest resistance possible, and consequently below the electrode 58 the member 60 is desirably provided with a skirt portion 65 to interrupt liquid continuity even in the form of a film between the electrode 58 and the walls of the cylinder. Additionally, an insulated deflector member 59 is preferably located above the disc 58 to deflect from the disc the liquid flowing from the orifice.

The electrode 58 is connected by means of an insulated wire 66 to a contact member 68 carried in an insulating insert 70 in the lower closure cap or plug 38.

In the particular wiring arrangement which will be described, the metal portions of the casing of the timing device must be insulated from the casing of the apparatus, and for this purpose the upper and lower cylinders are surrounded by insulating sleeves 72 and 74, respectively, which may take the form of rubber tubing cemented to the metal cylinders.

The timing device may contain as the operating liquid either mercury or an aqueous electrolyte.

If mercury is used, all of the metal parts of the apparatus in contact therewith are preferably made of any of the well known types of steels resistant to mercury. Because of the high surface tension and weight of mercury, the size of the orifice 42 must be carefully chosen to prevent both too rapid a flow of mercury, which would necessitate the chambers being of considerable length, and to permit the mercury to flow freely as the head decreases to uncover the electrode 46. With the use of mercury and suitable metal parts, corrosion is prevented, and if the timing apparatus is hermetically sealed, the timing device will remain operative indefinitely.

The liquid 76 may take the alternative form of an aqueous electrolyte, which, for example, may be a solution of a copper salt such as the sulphate or nitrate. In such case, the electrodes or other metal parts coming in contact with the liquid, i. e., the cylinders 30 and 32, should be made of pure copper, so that the electrolysis results merely in the solution of copper from one surface and deposition on another. Desirably, conditions are so adjusted as to eliminate the release of gas. Other materials are equally applicable. For example, the interior electrode surfaces of the cylinders may be silvered, the cylinders taking the form of brass or other cylinders heavily plated with silver. In such case, the electrolyte could be a solution of silver salt. Other electrolytes are equally applicable with proper choice of the electrode and wall materials.

An aqueous electrolyte has the advantage of permitting the apparatus to be smaller with greater freedom of choice of the orifice size, because less surface tension is involved, and also less weight. On the other hand, electrolytic solution and deposition would occur, and unless the currents are small, this solution and deposition will be sufficiently rapid to require replacement of the electrodes and the cylinders. In the case of an aqueous electrolyte of this type, it is desirable to coat certain of the parts which it is not desired to replace, for example, the upper surface of the plugs 34 and 38, so that only the cylinders need be replaced. As will be evident hereafter, mercury may be used to carry heavy currents directly through the device, while if an aqueous electrolyte is used, a relay is preferably involved capable of being operated by currents of the order of a few milliamperes.

It will be evident that instead of using the cylinder walls as electrodes additional separate electrodes may be used. The walls form convenient electrodes, however, since requirements involving definite levels may be satisfied by predetermined positioning of small electrodes such as 46 and 58.

The timing device is associated with other elements, which, may take various forms, depending on the particular requirements. In Figure 3, for example, the timing device is in series with a battery 80 and a lamp 82. The casing may be regarded as the ground of the instrument. This arrangement is satisfactory even if the lamp 82 requires considerable current if mercury is used as the operating liquid.

If, on the other hand, an electrolyte is desirably used, the wiring diagram of Figure 4 may be adopted to prevent the passage of large currents through the timing apparatus. In this case, the lower contact 68 of the timing device is connected to the battery 79 having in series with it and connected to ground the relay coil 81, the relay being of a type adapted to close upon passage of a current of no more than a few milliamperes. The armature 83 of the relay is connected in series with a battery 85 and a lamp 87, or other element which may require a considerably greater current for its operation. Thus, while a large current is controlled, only a small current flows through the device, permitting repeated operations without damage due to electrolysis, which would require early replacement of parts.

Assuming for the purpose of explanation a photographic well surveying instrument of the type illustrated in Figure 1, in which a record is made by the timed illumination of a lamp or series of lamps such as 20, indicated in the wiring diagram of Figure 3 at 82, or in the alternative wiring diagram of Figure 4 at 87, the device is operated as follows:

After an operation of the device is completed, the electrolyte will be located in the lower cylinder 32. Normally the timing device is kept in this position prior to assembly. When the instrument is made up for operation, it may be made up in inverted position by dropping into the protective casing the various elements after removal of the bottom plug 4. If this is done, when the timing unit is inverted prior to and during insertion, the liquid 76 will flow rapidly into the upper cylinder through the tube 44, venting of air from that cylinder taking place through the orifice 42. After the elements have been located in the instrument and the plug 4 screwed on, the instrument should be kept in inverted position until it is desired to lower it into the hole. The cylinder 30 is of such size and contains such amount of liquid that when the instrument is in inverted position, the electrode 46 is above the liquid surface. Thus no engagement of the liquid with electrode 46 takes place in this reverse flow. This prevents any operation during the return flow of liquid to the upper cylinder.

As the instrument starts into the bore hole after being turned to upright position and with a recording disc 16 in place, the electrical configuration will be essentially that of Figure 3 or of Figure 4, depending on which wiring arrangement is used. In either case, the lamp is deenergized. The liquid slowly flows through the orifice 42 at a rate determined by its opening and drops into the lower cylinder, being deflected from the electrode 58 by the deflecting element 59 above that electrode. The electrode 46 is submerged during this operation, but until the electrode 58 is submerged by accumulation of liquid in the lower cylinder there is no circuit completed through the timing device 24. The design is such that electrode 58 will not be reached by the liquid until the instrument is resting in the position at which a record is to be made.

The arrangement is such that the liquid rises to electrode 58, before it uncovers the electrode 46. The result is that a circuit is completed from the electrode 46 through the liquid to the wall of the upper cylinder, and thence from the wall of the lower cylinder through the liquid in the lower cylinder and the electrode 58. The current thus flowing closes the circuit through the lamp 82 or the relay 81, and in the latter case the lamp 87 will be energized. This flow of current continues until the liquid uncovers the electrode 46, whereupon the parts will return to their original condition, the lamps being deenergized.

After the instrument is brought to the surface, if it is inverted for the removal of the apparatus through the bottom of the casing after taking off the nose plug 4, the liquid will flow rapidly into the upper chamber 30 without completing the control circuit. Thus no second exposure will be made.

It will be evident that the timing device controls both the delay in the making of the record and the time of exposure or other operation during which the record is made. The delay before the recording is initiated depends upon the time required for the liquid to rise in the lower chamber to the electrode 58. The duration of the recording operation depends upon the interval between the liquid's engaging electrode 58 and dropping out of contact with the electrode 46.

It will be evident that the principles of the invention are of general applicability in the use of liquid for electrical timing purposes, irrespective of the particular arrangement for providing for the bridging of electrodes by the liquid. As an example, reference may be made to the device of Figure 5, which involves essentially the timed flow principles of Winn Patent 2,134,808, dated November 1, 1938, and of Davis application Serial No. 310,296, filed December 21, 1939. This apparatus comprises a liquid supply chamber 86 from which, through a calibrated orifice 88, the liquid, which may be either mercury or an electrolyte as described above, flows into an intermediate chamber 90 from which, after it rises to the bend of a siphon 92, it is discharged into the bottom of a chamber 94 having a restricted outlet tube 96 so that the liquid rises in chamber 94 so long as delivery through siphon 92 is taking place, and then drops, being delivered into a receiving chamber 98. Communicating with the receiving chamber 98 is a tube 100 surrounding the lower leg of the siphon 92, while a vent and liquid return tube 102 extends from the top of the record chamber into the top of the supply chamber 86, there being provided a vent opening 103 in this tube in the upper portion of the intermediate chamber 90.

An electrode 104 is located in the lower portion of the chamber 94, being supported by an insulating member 106 secured in this chamber and provided with openings 108 permitting the free flow of liquid. An insulated wire 110 connects the electrode 104 with a lower contact 112. In this apparatus, the electrode cooperating with electrode 104 is provided by the inner walls of the chamber 94. The timing device is grounded to the protective casing, and the contact 112 is connected in the same fashion as contact 68 of the preceding modification.

In the operation of this device a circuit is completed as soon as the electrode 104 is submerged by liquid, and the contact is broken as soon as the liquid subsides from that contact. As described in said Davis application, inversion of this apparatus results in return of the liquid to the receiving chamber. The flow involved need not be described in detail, since it is identical with that described in said application.

What I claim and desire to protect by Letters Patent is:

1. An electrical timing means comprising a plurality of chambers, means for controlling flow of electrically conductive liquid from one chamber to another, the latter chamber having internal conductive walls adapted to make electrical contact with said liquid, and electrode means arranged in the latter chamber to be electrically connected by said liquid after occurrence of a predetermined flow, and to be disconnected electrically after occurrence of a further predetermined flow.

2. An electrical timing means comprising a plurality of chambers, means for controlling flow of electrically conductive liquid from one chamber to another, both of said chambers having internal conductive walls electrically connected to each other and adapted to make electrical contact with said liquid, and electrode means in both chambers arranged to be electrically connected to their respective chamber walls by said liquid, said arrangement being such that an electrical circuit is completed through said electrode means and chamber walls in series after occurrence of a predetermined flow, and is interrupted after occurrence of a further predetermined flow.

GOTTDANK L. KOTHNY.